(12) United States Patent
Bogachuk et al.

(10) Patent No.: US 9,637,175 B2
(45) Date of Patent: May 2, 2017

(54) EXTRUDED VEHICLE BODY COMPONENT

(71) Applicant: FORD GLOBAL TECHNOLOGIES, LLC, Dearborn, MI (US)

(72) Inventors: Vladimir Vladimirovich Bogachuk, West Bloomfield, MI (US); Edward Andrew Pleet, Novi, MI (US); Scott Mair, Woodhaven, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/825,214

(22) Filed: Aug. 13, 2015

(65) Prior Publication Data

US 2017/0043811 A1 Feb. 16, 2017

(51) Int. Cl.
*B60N 99/00* (2006.01)
*B62D 25/04* (2006.01)
*B21D 47/01* (2006.01)

(52) U.S. Cl.
CPC ............. *B62D 25/04* (2013.01); *B21D 47/01* (2013.01)

(58) Field of Classification Search
CPC ................................ B62D 25/04; B21D 47/01
See application file for complete search history.

(56) References Cited

U.S. PATENT DOCUMENTS

| | | | |
|---|---|---|---|
| 6,099,071 A | 8/2000 | Kasuga et al. | |
| 7,735,907 B2* | 6/2010 | Moore | B21D 19/086 296/193.06 |
| 2003/0175542 A1 | 9/2003 | Wuellrich et al. | |
| 2004/0124672 A1* | 7/2004 | Eipper | B62D 25/087 296/210 |
| 2005/0200103 A1* | 9/2005 | Burns | B60R 21/2644 280/730.2 |
| 2012/0153669 A1* | 6/2012 | Nagwanshi | B62D 29/005 296/187.08 |
| 2014/0049059 A1 | 2/2014 | Kutscher et al. | |
| 2014/0159432 A1* | 6/2014 | Kim | B62D 25/06 296/203.01 |
| 2015/0097395 A1* | 4/2015 | Faruque | B62D 25/04 296/187.12 |
| 2015/0115662 A1* | 4/2015 | Joyce | B62D 25/06 296/193.12 |
| 2015/0375794 A1* | 12/2015 | May | B62D 27/023 296/187.12 |

FOREIGN PATENT DOCUMENTS

| | | |
|---|---|---|
| CN | 202508036 U | 10/2012 |
| DE | 19915276 A1 | 10/2000 |
| EP | 2070807 A2 | 6/2009 |
| JP | 7227618 A2 | 8/1995 |
| JP | 8174046 A2 | 7/1996 |

* cited by examiner

*Primary Examiner* — Lori L Lyjak
(74) *Attorney, Agent, or Firm* — Jason Rogers; Brooks Kushman P.C.

(57) ABSTRACT

A vehicle body component is provided. The vehicle body component includes an extruded elongate member that has a longitudinally extending cross section. The elongate member includes a first section that extends along a first axis, a second section that extends from the first section along a second axis, and a third section that extends from the second section along a third axis, wherein the first axis and the third axis are non-coplanar with respect to each other.

12 Claims, 5 Drawing Sheets

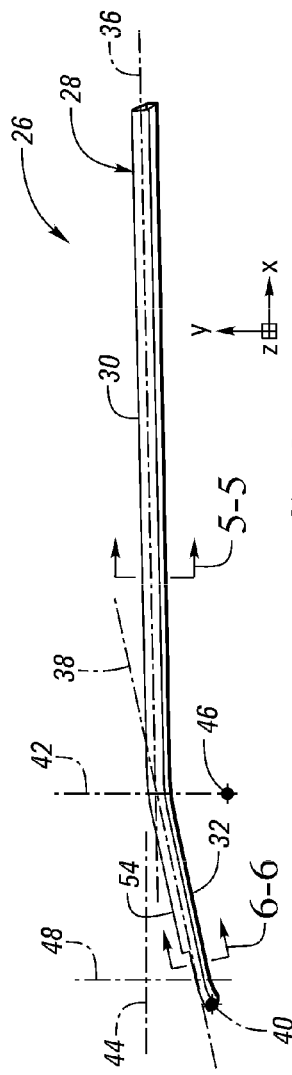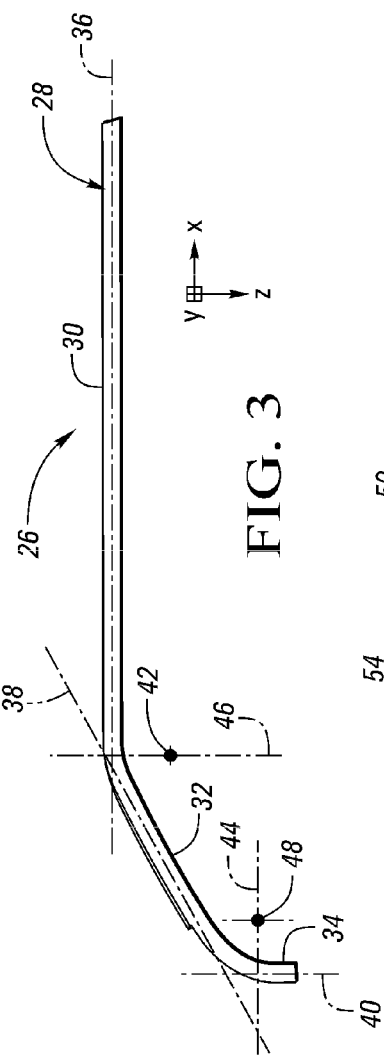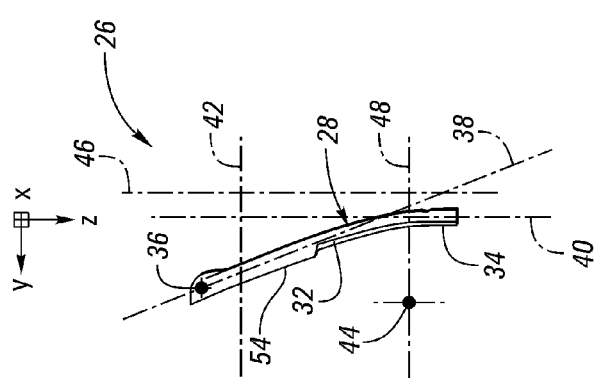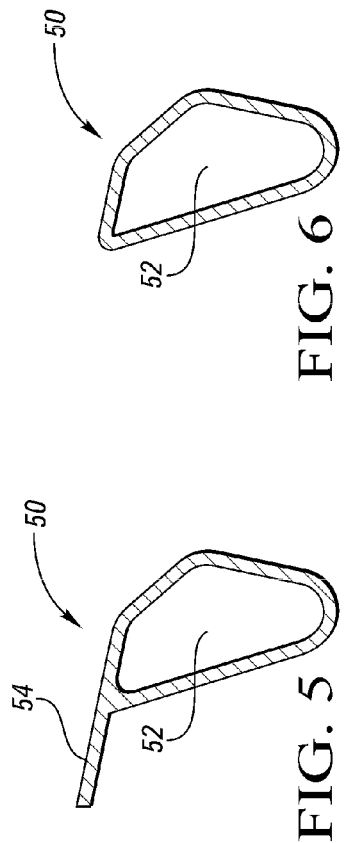
FIG. 2
FIG. 3
FIG. 4
FIG. 5
FIG. 6

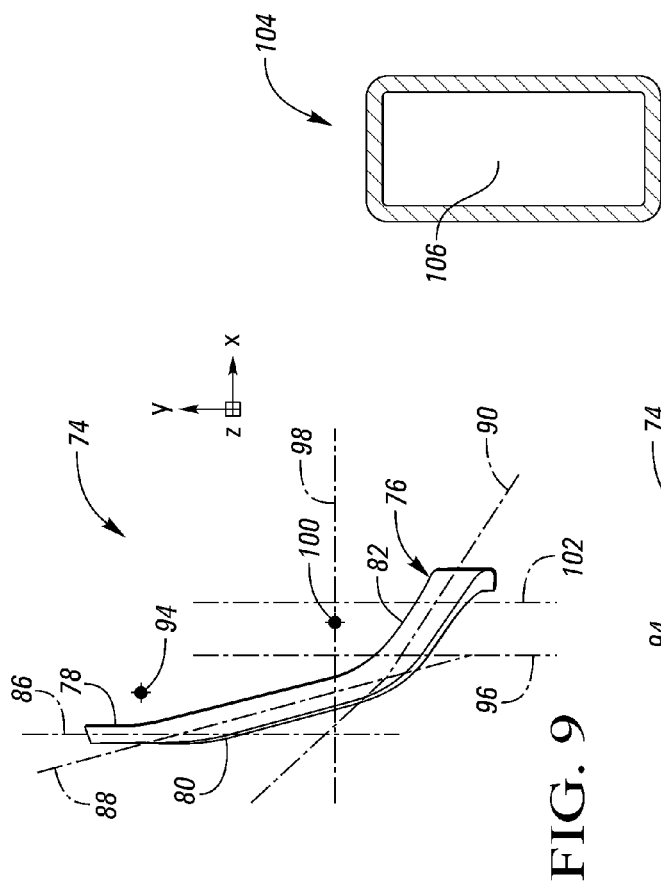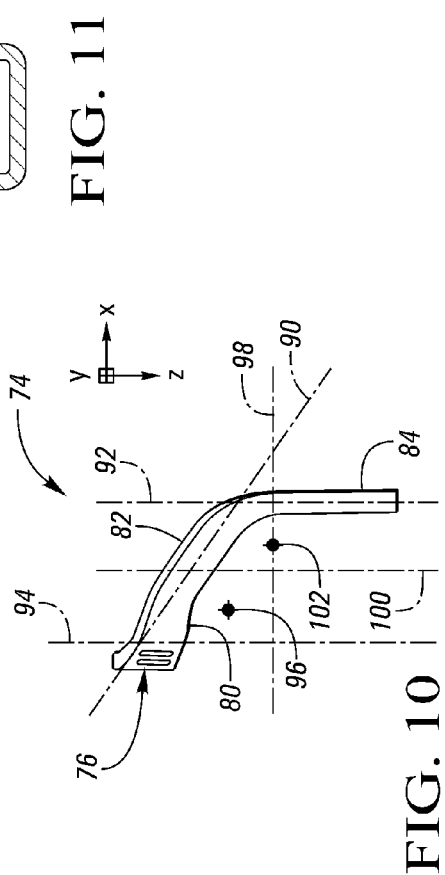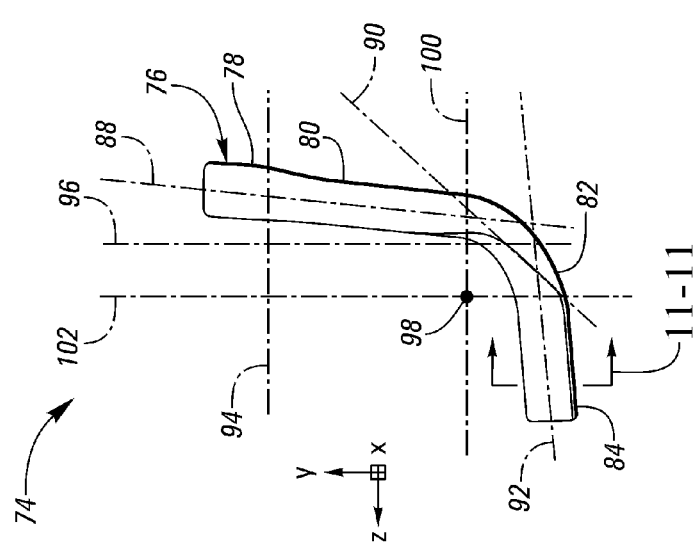

EXTRUDED VEHICLE BODY COMPONENT

TECHNICAL FIELD

The present disclosure relates to vehicle body components and a method of making vehicle body components.

BACKGROUND

Vehicle body components may be made by hydroforming or welding multiple stamped or roll-formed pieces together to obtain a cross section that is capable of providing the desired strength of the individual component. The hydroforming process is limited to materials having a lower gauge thickness and the stamped and roll-formed processes includes the additional manufacturing steps of forming multiple pieces that must then be connected together by a process such as welding.

SUMMARY

A method is provided. The method includes extruding an elongate member that has a longitudinally extending cross section, bending the elongate member with multi-axis bending machine about a first axis and subsequently about second axis non-parallel to the first axis to form a vehicle body component.

A vehicle body component is provided. The vehicle body component includes an extruded elongate member that has a longitudinally extending cross section. The elongate member includes a first section that extends along a first axis, a second section that extends from the first section along a second axis, and a third section that extends from the second section along a third axis, wherein the first axis and the third axis are non-coplanar with respect to each other.

A vehicle body component is provided. The vehicle body component includes a unitary extruded elongate member that has a longitudinally extending cross section. The elongate member includes a roof rail that extends along a first axis, an A-pillar that extends from the roof rail along a second axis, and an third section that extends from the A-pillar along a third axis, wherein the first axis and the third axis are non-coplanar.

BRIEF DESCRIPTION OF THE DRAWINGS

FIG. 2 is a top view of a first example of an extruded vehicle body component;

FIG. 3 is a side view of the first example of the extruded vehicle body component;

FIG. 4 is a front view of the first example of the extruded vehicle body component;

FIG. 5 is a cross-sectional view of the first example of the extruded vehicle body component taken along line 5-5 in FIG. 2;

FIG. 6 is a cross-sectional view of the first example of the extruded vehicle body component taken along line 6-6 in FIG. 2;

FIG. 8 is a side view of a second example of an extruded vehicle body component;

FIG. 9 is a top view of the second example of the extruded vehicle body component;

FIG. 10 is a front view of the second example of the extruded vehicle body component;

FIG. 11 is a cross-sectional view of the second example of the extruded vehicle body component taken along line 11-11 in FIG. 8.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
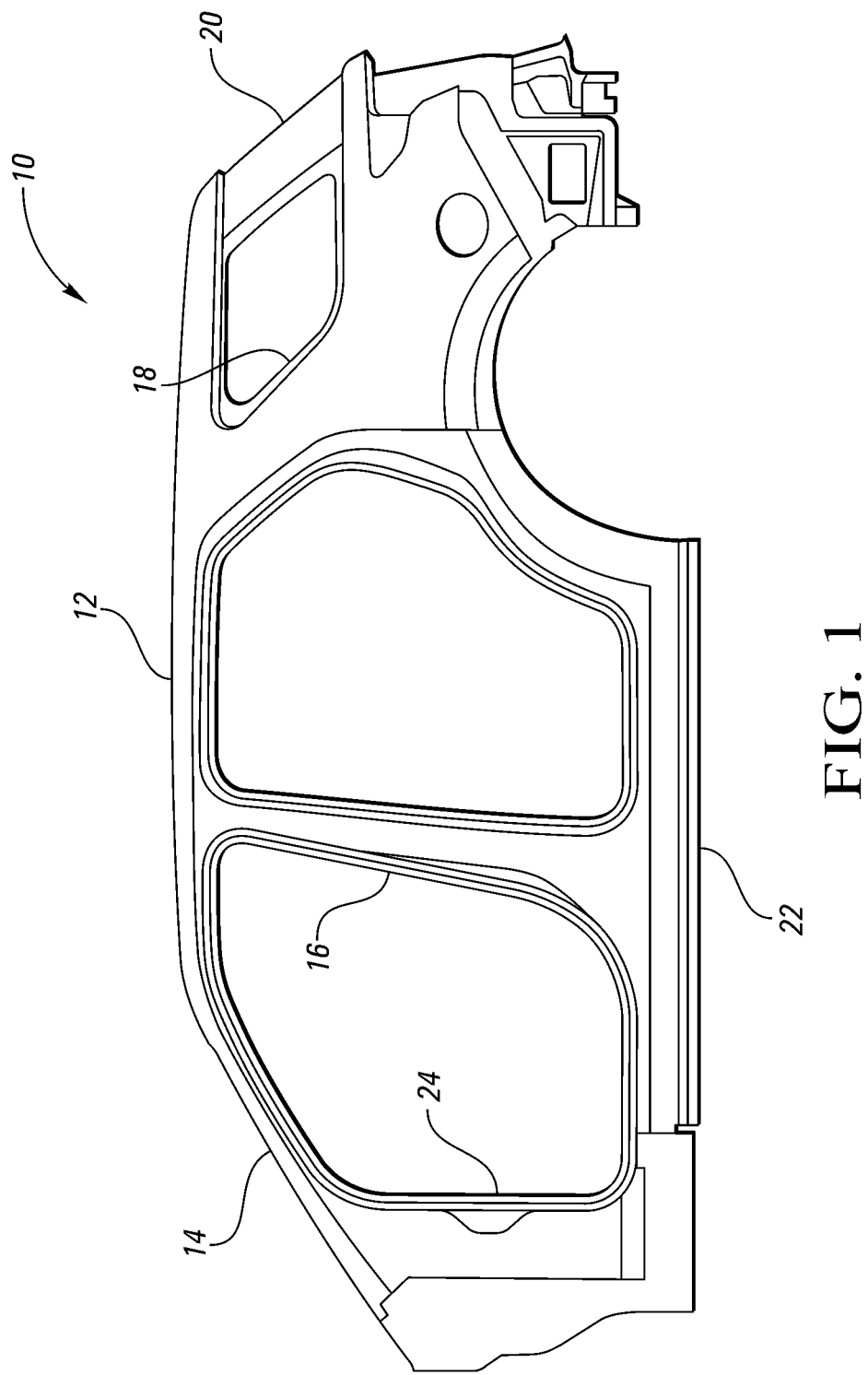
FIG. 1 is a side view of a vehicle body structure.

Referring to FIG. 1 a side view of a vehicle body structure 10 is illustrated. The body structure 10 may include a roof rail 12, A-pillar 14, B-pillar 16, C-pillar 18, D-pillar 20, side rail 22, A-pillar tower reinforcement 24, cross members, floor members, floor panels, or any other component of a vehicle body structure or frame known in the art.

Referring to FIGS. 2-6, a first embodiment of a vehicle body component 26 is illustrated. The vehicle body component 26 may comprise an extruded elongate member 28 that has a longitudinally extending cross-section. The extruded elongate member 28 may include a first section 30, a second section 32, and a third section 34. The first section 30 may extend along a first axis 36. The second section 32 may extend from the first section 30 along a second axis 38. The third section 34 may extend from the second section 32 along a third axis 40. The first axis 36 and the third axis 40 may be non-coplanar with respect to each other. The first section 30 of the extruded elongate member 28 may comprise a roof rail. The second section 32 of the extruded elongate member 28 may comprise an A-pillar. The third section 34 of the extruded elongate member 28 may comprise a hinge pillar. The first axis 36 is perpendicular to the drawing sheet in FIG. 4, while the third axis 40 is perpendicular to the drawing sheet in FIG. 2.

The second section 32 of the elongate member 28 may be bent about a first bending axis 42 relative to the first section 30. The third section 34 of the elongate member 28 may be bent about a second bending axis 44 relative to the second section 32. The first bending axis 42 may be non-parallel to the second bending axis 44. The second section 32 of the elongate member 28 may also be bent about a third bending axis 46 relative to the first section 30. The third section 34 of the elongate member 28 may also be bent about a fourth bending axis 48 relative to the second section 32. The third bending axis 46 may be non-parallel to the first bending axis 42, second bending axis 44, and/or fourth bending axis 48. The fourth bending axis 48 may be non-parallel to the first bending axis 42, second bending axis 44, and/or third bending axis 46 (Although it is shown to be parallel with the first bending axis 42 in this embodiment). The first bending axis 42 and fourth bending axis 48 are perpendicular to the drawing sheet in FIG. 3; the third bending axis 46 is perpendicular to the drawing sheet in FIG. 2; and the second bending axis 44 is perpendicular to the drawing sheet in FIG. 4.

All of the axes shown in FIGS. 2-4 are for illustrative purposes only and may not be in their exact positions. For example, the axes 36, 38, and 40 that the sections 30, 32, and 34 of the elongate member 28 extend along that may be non-coplanar to each other, may also be non-perpendicular to each other or non-perpendicular to any plane that the other non-planar axis may exist on. Also, the bending axes 42, 44, 46, and 48 that may be non-parallel to each other, may also be non-perpendicular to each other or non-perpendicular to any plane that the other non-parallel axis may exist on. Additionally, the axes are not required to be aligned with Cartesian coordinates as shown.

Referring to FIGS. 5 and 6, the longitudinally extending cross-section 50 of the elongate member 28 is illustrated. The longitudinally extending cross section 50 may be a closed cross-section that includes an internally closed open area 52. The elongate member 28 may include at least one flange 54 that extends laterally from the longitudinally extending cross-section 50. The at least one flange 54 may extend only over a portion of the elongate member 28. The at least one flange 54 extending over only a portion of the elongate member 28 is demonstrated in FIGS. 2, 5, and 6. FIG. 5 is a cross-section of the elongate member 28 taken along a portion of the elongate member 28 in FIG. 2 that includes the flange 54. FIG. 6, on the other hand, is a cross-section of the elongate member in 28 taken along a portion of the elongate member 28 in FIG. 2 that does not include the flange 54.

Figure 7:
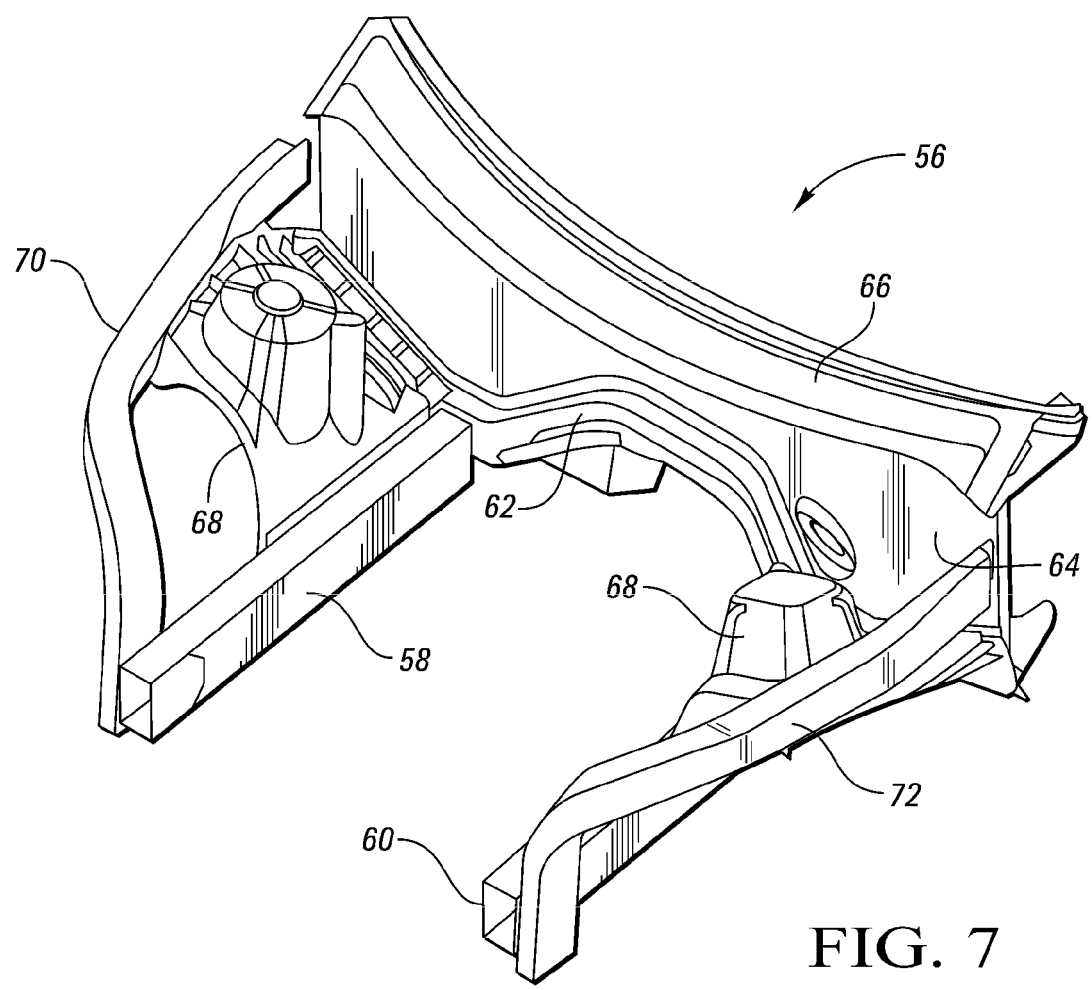
FIG. 7 is an isometric view of a front portion of a vehicle body structure.

Referring to FIG. 7 an isometric view of a front portion of a vehicle body structure 56 is illustrated. The front portion of the vehicle body structure 56 may include a first inner front rail 58, second inner front rail 60, front rail cross member 62, dash panel 64 (which may also be a firewall), dash panel cross member 66, shock towers 68, first shotgun member 70, second shotgun member 72, or any other component of a front portion of a vehicle body structure or frame known in the art. The first inner front rail 58, second inner front rail 60, and front rail cross member 62 may be components of a front rail sub-system.

Referring to FIGS. 8-11, a second embodiment of a vehicle body component 74 is illustrated. The vehicle body component 74 may comprise an extruded elongate member 76 that has a longitudinally extending cross-section. The extruded elongate member 76 may include a first section 78, a second section 80, a third section 82, and a fourth section 84. The first section 78 may extend along a first axis 86. The second section 80 may extend from the first section 78 along a second axis 88. The third section 82 may extend from the second section 80 along a third axis 90. The fourth section 84 may extend from the third section 82 along a fourth axis 92. The first axis 86 and the third axis 90 may be non-coplanar. The fourth axis 92 may be non-coplanar with the first axis 86 and/or the second axis 88. The extruded elongate member 76 may comprise a shotgun member.

The second section 80 of the elongate member 76 may be bent about a first bending axis 94 relative to the first section 78. The third section 82 of the elongate member 76 may be bent about a second bending axis 96 relative to the second section 80. The fourth section 84 of the elongate member 76 may be bent about a third bending axis 98 relative to the third section 82. The first bending axis 94 and the second bending axis 96 may be non-parallel. The third bending axis 98 may be non-parallel with both the first bending axis 94 and the second bending axis 96. The third section 82 of the elongate member 76 may also be bent about a fourth bending axis 100 relative to the second section 80. The fourth section 84 of the elongate member 76 may also be bent about a fifth bending axis 102 relative to the third section 82. The fourth bending axis 100 may be non-parallel to the first bending axis 94, second bending axis 96, third bending axis 98, and/or fifth bending axis 102 (Although it is shown to be parallel with the first bending axis 94 in this embodiment). The fifth bending axis 102 may be non-parallel to the first bending axis 94, second bending axis 96, third bending axis 98, and/or fourth bending axis 100 (Although it is shown to be parallel with the second bending axis 96 in this embodiment). The first bending axis 94 and fourth bending axis 100 are perpendicular to the drawing sheet in FIG. 9; the third bending axis 98 is perpendicular to the drawing sheet in FIG. 8; and the second bending axis 96 and fifth bending axis 102 are perpendicular to the drawing sheet in FIG. 10.

All of the axes shown in FIGS. 8-10 are for illustrative purposes only and may not be in their exact positions. For example, the axes 86, 88, 90, and 92 that the sections 78, 80, 82, and 84 of the elongate member 76 extend along that may be non-coplanar to each other, may also be non-perpendicular to each other or non-perpendicular to any plane that the other non-planar axis may exist on. Also, the bending axes 94, 96, 98, 100, and 102 that may be non-parallel to each other, may also be non-perpendicular to each other or non-perpendicular to any plane that the other non-parallel axis may exist on. Additionally, the axes are not required to be aligned with Cartesian coordinates as shown.

Referring to FIG. 11, the longitudinally extending cross-section 104 of the elongate member 76 is illustrated. The longitudinally extending cross section 104 may be a closed cross-section that includes an internally closed open area 106. The elongate member 76 may include at least one flange that extends laterally from the longitudinally extending cross-section 104 (even though a flange is not shown in this embodiment). The at least one flange may extend only over a portion of the elongate member 76.

The disclosure should not be construed as limited to number axes and bending axes shown in the embodiments described above, but should be construed to include extruded vehicle body components that have at least three sections, each extending along an axis where at least two of the axes are non-coplanar. Furthermore, the disclosure should be construed to include extruded vehicle body components that are bent about two or more axes where at least two of the axes are non-parallel.

The elongate members 28, 76 may also include cut-outs, trimmed sections, through holes, tapped holes, etc. The cut-outs or trimmed sections may provide clearance for adjacent components of the vehicle body or vehicle. For example, the portion of the elongate member 28 that does not include the flange 54 may be the result of a manufacturing process that removed excess material. The through holes or tapped holes may be configured to accept fasteners, such as bolts, screws, or rivets, that may be used to mount the elongate member to an adjacent component of the vehicle body or vehicle.

Figure 12:
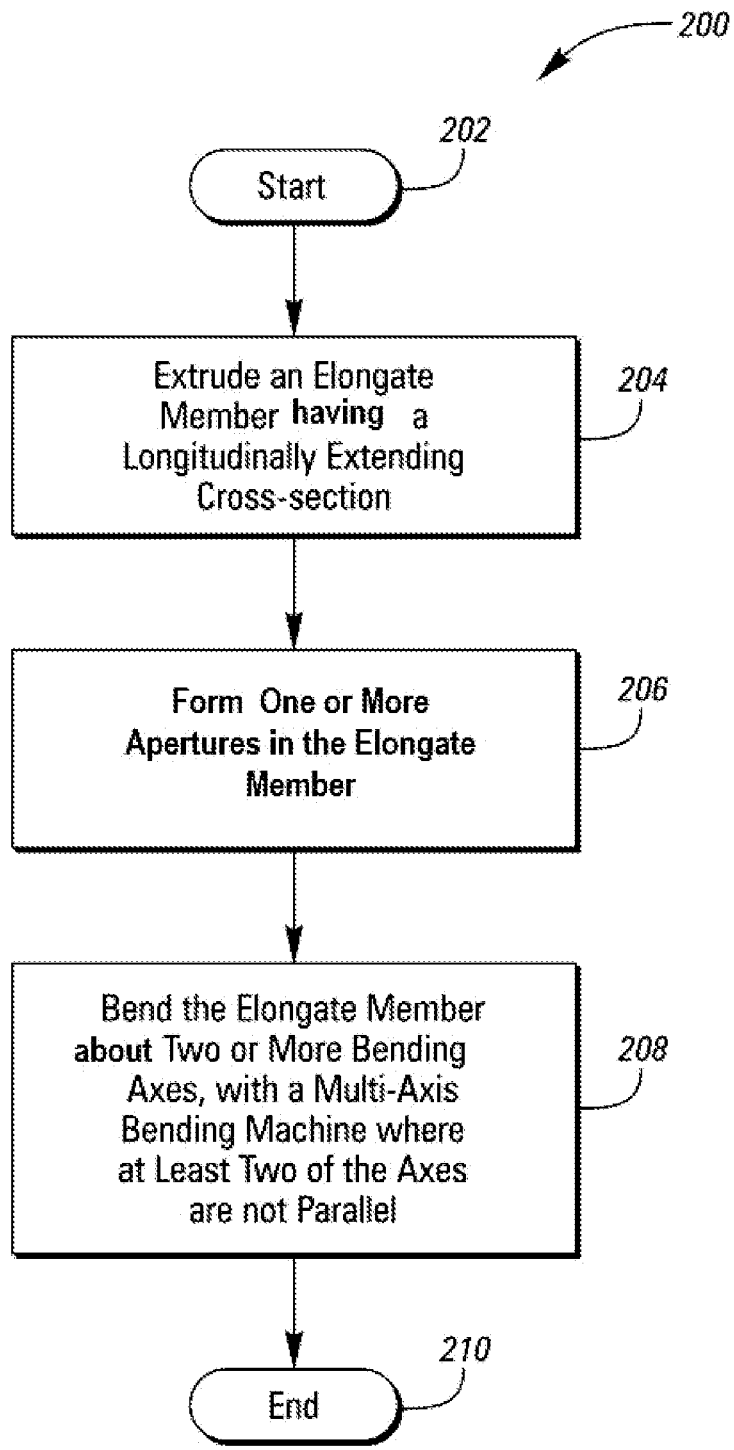
FIG. 12 is a method of producing an extruded vehicle body component.

Referring to FIG. 12, a method 200 of producing a vehicle body component is illustrated. The method 200 is initiated at the start block 202. Next, the method 200 moves on to step 204 where an elongate member that has a longitudinally extending cross-section is extruded. After the elongate member is extruded, the method 200 moves on to step 206 where manufacturing holes (or apertures) are formed in the elongate member. The apertures may include cut-outs, trimmed sections, through holes, tapped holes, etc. The apertures may be added by a drilling process, punching process, laser cutting process, water jet cutting process, grinding process, or any other manufacturing process known in the art that is capable of removing material from a manufactured component. Alternatively at step 206, other manufacturing processes such as milling, notching, polishing, etc. may be performed. It should be noted, however, that step 206 may be omitted. Once the apertures have been added at step 206, the method 200 moves on step 208 were the elongate member is bent about two or more bending axes, with a multi-axis bending machine, wherein at least two of the axes are non-parallel. For example, at step 208 the elongate member may be bent about a first axis and a second axis, wherein the first axis and second axis are non-parallel. In a further example, at step 208 the elongate member may be bent about a third axis, wherein the third axis is non-parallel to the first axis or the second axis. Once step 208 is complete the method ends at step 210.

The disclosure should not be construed as limited to the shape, form, and type of vehicle body structure 10 illustrated in FIG. 1 or the front portion of a vehicle body structure 56 illustrated in FIG. 2, but should be construed to include all vehicle body structures, and vehicle body or frame components that may comprise the vehicle body structures that are known in the art.

The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle body component comprising:
   an extruded elongate member having a longitudinally extending cross section, a first section extending along a first axis, a second section extending from the first section and along a second axis, a third section extending from the second section and along a third axis, the first axis and the third axis being non-coplanar with respect to each other.

2. The vehicle body component of claim 1, wherein the elongate member includes a fourth section extending from the third section and along a fourth axis, wherein the fourth axis is non-coplanar to the first axis or the second axis.

3. The vehicle body component of claim 1, wherein the elongate member includes at least one flange extending laterally from the longitudinally extending cross section.

4. The vehicle body component of claim 3, wherein the flange extends longitudinally along a portion of the length of the elongate member.

5. The vehicle body component of claim 1, wherein the longitudinally extending cross section is a closed cross section.

6. The vehicle body component of claim 1, wherein the vehicle body component is a roof rail and A-pillar combination.

7. The vehicle body component of claim 1, wherein the vehicle body component is a roof rail, A-pillar, and hinge pillar combination.

8. The vehicle body component of claim 1, wherein the vehicle body component is a shotgun member.

9. A vehicle body component comprising:
   a unitary extruded elongate member having a longitudinally extending cross section, having a roof rail extending along a first axis, an A-pillar extending from the roof rail along a second axis, and an third section extending from the A-pillar along a third axis, the first axis and the third axis being non-coplanar with respect to each other.

10. The vehicle body component of claim 9, wherein the elongate member includes at least one flange extending laterally from the longitudinally extending cross section.

11. The vehicle body component of claim 10, wherein the flange extends longitudinally along a portion of the length of the elongate member.

12. The vehicle body component of claim 9, wherein the longitudinally extending cross section is a closed cross section.

* * * * *